(12) United States Patent
Ji et al.

(10) Patent No.: US 11,463,764 B2
(45) Date of Patent: Oct. 4, 2022

(54) METHOD AND SYSTEM FOR AUTOMATICALLY ADJUSTING INTENSITY OF SIGNAL OUTPUTTED BY HDMI TRANSMITTER

(71) Applicant: LONTIUM SEMICONDUCTOR CORPORATION, Anhui (CN)

(72) Inventors: Xiangyu Ji, Anhui (CN); Yanan Zhang, Anhui (CN); Haiyan Wei, Anhui (CN); Jiaxi Fu, Anhui (CN); Lianliang Tai, Anhui (CN); Yu Chen, Anhui (CN); Yongling Zhang, Anhui (CN)

(73) Assignee: LONTIUM SEMICONDUCTOR CORPORATION, Anhui (CN)

( * ) Notice: Subject to any disclaimer, the term of this patent is extended or adjusted under 35 U.S.C. 154(b) by 0 days.

(21) Appl. No.: 17/150,874

(22) Filed: Jan. 15, 2021

(65) Prior Publication Data

US 2022/0174351 A1 Jun. 2, 2022

(30) Foreign Application Priority Data

Dec. 2, 2020 (CN) .................... 202011399587.X

(51) Int. Cl.
*H04N 21/4363* (2011.01)
*G09G 5/00* (2006.01)
*H04N 5/775* (2006.01)

(52) U.S. Cl.
CPC ....... *H04N 21/43635* (2013.01); *G09G 5/006* (2013.01); *H04N 5/775* (2013.01); *G09G 2370/047* (2013.01); *G09G 2370/12* (2013.01)

(58) Field of Classification Search
CPC .. H04N 21/43635; H04N 5/775; G09G 5/006; G09G 2370/047; G09G 2370/12
See application file for complete search history.

(56) References Cited

U.S. PATENT DOCUMENTS

| 9,042,437 B2* | 5/2015 | Boccaccio | H04L 25/03885 375/232 |
| 2002/0057101 A1* | 5/2002 | Tang | H04L 25/03878 326/29 |
| 2008/0109180 A1* | 5/2008 | Keady | H04L 25/242 702/89 |
| 2010/0020179 A1* | 1/2010 | Horan | H04L 1/243 348/192 |
| 2010/0283894 A1* | 11/2010 | Horan | H04N 5/775 348/441 |

(Continued)

FOREIGN PATENT DOCUMENTS

CN 105307245 A * 2/2016

*Primary Examiner* — Paulos M Natnael
(74) *Attorney, Agent, or Firm* — Harness, Dickey & Pierce, P.L.C.

(57) ABSTRACT

A method and a system for automatically adjusting intensity of a signal outputted by an HDMI transmitter are provided. With the method, a length of an HDMI transmission line between the HDMI transmitter and an HDMI receiver is determined. A swing amplitude and a pre-emphasis intensity of the signal outputted by the HDMI transmitter are determined based on the length of the HDMI transmission line and a frequency of the signal outputted by the HDMI transmitter. An HDMI output drive circuit is configured based on the swing amplitude and the pre-emphasis intensity.

6 Claims, 3 Drawing Sheets

(56) References Cited

U.S. PATENT DOCUMENTS

| | | | |
|---|---|---|---|
| 2011/0043707 A1* | 2/2011 | Umezu | H04N 21/43072 |
| | | | 348/E5.093 |
| 2014/0119423 A1* | 5/2014 | Boccaccio | H04L 25/03878 |
| | | | 375/232 |
| 2014/0119425 A1* | 5/2014 | Boccaccio | G09G 5/006 |
| | | | 375/232 |

* cited by examiner

METHOD AND SYSTEM FOR AUTOMATICALLY ADJUSTING INTENSITY OF SIGNAL OUTPUTTED BY HDMI TRANSMITTER

The present application claims priority to Chinese Patent Application No. 202011399587.X, titled "METHOD AND SYSTEM FOR AUTOMATICALLY ADJUSTING INTENSITY OF SIGNAL OUTPUTTED BY HDMI TRANSMITTER", filed on Dec. 2, 2020 with the China National Intellectual Property Administration, which is incorporated herein by reference in its entirety.

FIELD

The present disclosure relates to the technical field of signal transmission, and in particular to a method and a system for automatically adjusting an intensity of a signal outputted by a high definition multimedia interface (HDMI) transmitter.

BACKGROUND

An HDMI is a common video signal interface, and may be applied in devices such as a set-top box, a digital versatile disc (DVD) player, a personal computer, a game console, a digital audio and a television.

When an HDMI transmitter transmits a signal to an HDMI receiver via an HDMI transmission line, the signal is increasingly damaged as a frequency of the signal increases during transmission. In order for the HDMI receiver to receive the signal with a better waveform, it is required to compensate for the damaged signal. In the pre-emphasis technology, a high-frequency component in the signal is enhanced at the beginning of the transmission line to compensate for excessive attenuation of the high-frequency component during the transmission. However, the current pre-emphasis processing adopts a fixed pre-emphasis intensity. Energy is wasted in case of a short HDMI transmission line, and insufficient compensation for high-frequency energy results in poor quality of a signal received by the HDMI receiver in case of a long HDMI transmission line.

SUMMARY

In view of this, a method and a system for automatically adjusting intensity of a signal outputted by an HDMI transmitter are provided according to the present disclosure, to optimally adjust the intensity of the signal for different HDMI transmission line lengths and different signal frequencies, so as to acquire best quality of an outputted signal.

The following technical solutions are provided according to the present disclosure.

A method for automatically adjusting intensity of a signal outputted by an HDMI transmitter is provided according to a first aspect of the present disclosure. The method includes: determining a length of an HDMI transmission line between the HDMI transmitter and an HDMI receiver; determining a swing amplitude and a pre-emphasis intensity of the signal outputted by the HDMI transmitter based on the length of the HDMI transmission line and a frequency of the signal outputted by the HDMI transmitter; and configuring an HDMI output drive circuit based on the swing amplitude and the pre-emphasis intensity.

In an embodiment, the determining a length of an HDMI transmission line between the HDMI transmitter and an HDMI receiver includes: determining whether the HDMI receiver is in a connection state, and transmitting a detection pulse signal to the HDMI receiver via an interface of the HDMI transmitter and starting timing when the detection pulse signal is transmitted in a case that the HDMI receiver is in a connection state; and receiving a pulse signal reflected by the HDMI receiver via a detection port of the HDMI transmitter, and stopping the timing when the reflected pulse signal is received. A timing result indicates the length of the HDMI transmission line.

In an embodiment, the detection port is one of a hot plug detection (HPD) port, a display data channel (DDC) port, and a consumer electronics control (CEC) port.

In an embodiment, the detection pulse signal is a negative pulse signal.

A system for automatically adjusting intensity of a signal outputted by an HDMI transmitter is provided according to a second aspect of the present disclosure. The system includes a detection module, a microcontroller unit (MCU) and an HDMI output drive circuit. The detection module is configured to determine a length of an HDMI transmission line between the HDMI transmitter and an HDMI receiver. The MCU is configured to determine a swing amplitude and a pre-emphasis intensity of the signal outputted by the HDMI transmitter based on the length of the HDMI transmission line and a frequency of the signal outputted by the HDMI transmitter. The MCU is further configured to configure the HDMI output drive circuit based on the swing amplitude and the pre-emphasis intensity.

In an embodiment, the detection module includes an HPD port, a detection pulse generation circuit, a detection port, a counter controller and a counter. The HPD port is configured to: determine whether the HDMI receiver is in a connection state; and transmit a signal to the MCU, where the signal indicates whether the HDMI receiver is in a connection state. The detection pulse generation circuit is configured to, when a detection start signal transmitted by the MCU is received, generate a pulse signal and transmit the pulse signal to the detection port. The detection port is configured to output a detection pulse signal to a channel of the HDMI transmission line corresponding to the detection port in response to the pulse signal transmitted by the detection pulse generation circuit, and transmit a first trigger signal to the counter controller. The counter controller is configured to control the counter to start timing when the first trigger signal is received. The counter is configured to record the number of cycles of a clock signal during the timing. The detection port is further configured to receive a pulse signal reflected by the HDMI receiver, and transmit a second trigger signal to the counter controller when the reflected pulse signal is received. The counter controller is further configured to, when the second trigger signal is received, control the counter to stop timing, and transmit a detection completion signal to the MCU. The MCU is further configured to read a timing result of the counter when the detection completion signal is received. The timing result indicates the length of the HDMI transmission line.

In an embodiment, the detection port is one of an HPD port, a DDC port, and a CEC port.

In an embodiment, each of the detection pulse signal, the first trigger signal, the second trigger signal, and the pulse signal generated by the detection pulse generation circuit is a negative pulse signal.

Compared with the conventional technology, technical solutions of the present disclosure have the following beneficial effects.

A method and a system for automatically adjusting intensity of a signal outputted by an HDMI transmitter are provided according to the present disclosure. With the method, a correspondence among the length of the HDMI transmission line, the frequency of the signal outputted by the HDMI transmitter, and the swing amplitude of the signal outputted by the HDMI transmitter is preset, and a correspondence among the length of the HDMI transmission line, the frequency of the signal outputted by the HDMI transmitter, and the pre-emphasis intensity of the signal outputted by the HDMI transmitter is preset, such that the swing amplitude and the pre-emphasis intensity of the signal outputted by the HDMI transmitter can be determined based on the length of the HDMI transmission line and the frequency of the signal outputted by the HDMI transmitter in an actual communication system, thereby configuring the HDMI output drive circuit. Therefore, a swing amplitude and a pre-emphasis intensity of a signal outputted by the HDMI transmitter can vary with a length of an HDMI transmission line and a frequency of the signal, to compensate for attenuation of the signal due to the transmission line, such that an HDMI receiver can receive a signal with optimum quality.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. It is apparent that the drawings in the following description show only some embodiments of the present disclosure, and other drawings may be obtained by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

Figure 1:
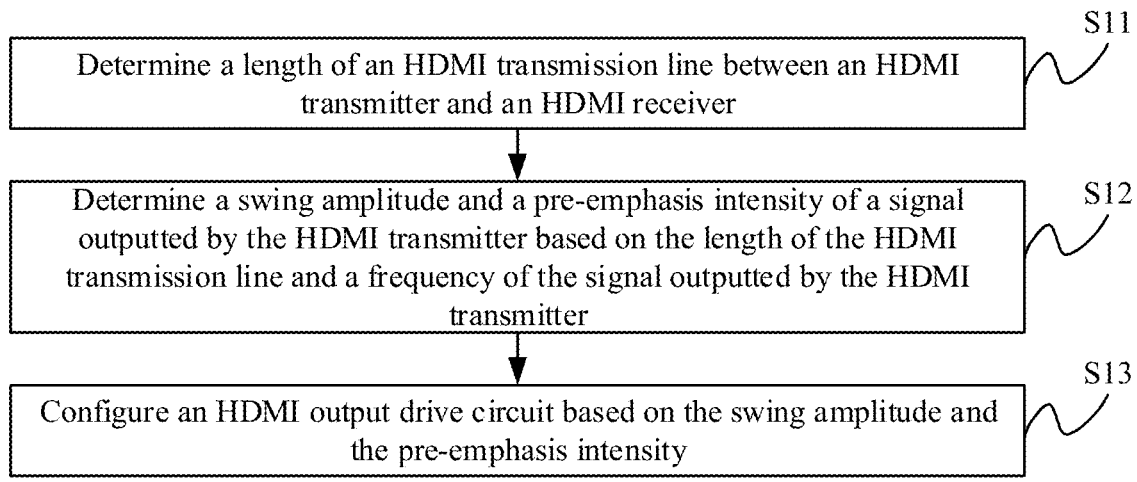
FIG. 1 is a flowchart of a method for automatically adjusting an intensity of a signal outputted by an HDMI transmitter according to an embodiment of the present disclosure.

Referring to FIG. 1, a method for automatically adjusting an intensity of a signal outputted by an HDMI transmitter according to an embodiment of the present disclosure includes the following steps S11 to S13.

In S11, a length of an HDMI transmission line between the HDMI transmitter and an HDMI receiver is determined.

In practical applications, the HDMI transmission line may have a length of 1 m, 2 m, 3 m or even 15 m or more. The length of the HDMI transmission line varies with application environments and transmission distance requirements. The pre-emphasis processing adopting the fixed pre-emphasis intensity according to the conventional technology may easily result in energy waste or severe attenuation of the signal. In the present disclosure, the length of the HDMI transmission line between the HDMI transmitter and the HDMI receiver in an actual communication system is determined, so as to automatically adjust the intensity of the signal outputted by the HDMI transmitter based on dynamic variations in the length of the HDMI transmission line.

In S12, a swing amplitude and a pre-emphasis intensity of the signal outputted by the HDMI transmitter are determined based on the length of the HDMI transmission line and a frequency of the signal outputted by the HDMI transmitter.

The frequency of the signal outputted by the HDMI transmitter is known on a side of the HDMI transmitter. A correspondence among the length of the HDMI transmission line, the frequency of the signal outputted by the HDMI transmitter, and the swing amplitude of the signal outputted by the HDMI transmitter is preset, and a correspondence among the length of the HDMI transmission line, the frequency of the signal outputted by the HDMI transmitter, and the pre-emphasis intensity of the signal outputted by the HDMI transmitter is preset. Specifically, the correspondence among the length of the HDMI transmission line, the frequency of the signal outputted by the HDMI transmitter, and the swing amplitude of the signal outputted by the HDMI transmitter as well as the correspondence among the length of the HDMI transmission line, the frequency of the signal outputted by the HDMI transmitter, and the pre-emphasis intensity of the signal outputted by the HDMI transmitter may be set in a form of a table. Therefore, after the length of the HDMI transmission line between the HDMI transmitter and the HDMI receiver in the actual communication system is determined, the swing amplitude and the pre-emphasis intensity of the signal outputted by the HDMI transmitter can be determined based on the frequency of the signal outputted by the HDMI transmitter and the preset correspondences, so as to perform subsequent configuration.

In S13, an HDMI output drive circuit is configured based on the swing amplitude and the pre-emphasis intensity.

The HDMI output drive circuit is configured to output an HDMI high-speed data signal, which is transmitted to the HDMI receiver via the HDMI transmission line. The HDMI output drive circuit is a circuit in the HDMI transmitter. The HDMI high-speed data signal outputted by the HDMI output drive circuit is the signal outputted by the HDMI transmitter.

In some embodiments, the length of the HDMI transmission line between the HDMI transmitter and the HDMI receiver is determined as follows. It is determined whether the HDMI receiver is in a connection state. If the HDMI receiver is in a connection state, the HDMI transmitter transmits a detection pulse signal to the HDMI receiver via an interface of the HDMI transmitter. Timing is started when the HDMI transmitter transmits the detection pulse signal. Since a pull-up resistor of the HDMI receiver has a relatively large resistance, generally greater than 1 k ohm, which is much greater than characteristic impedance of the HDMI transmission line, the resistance of the pull-up resistor of the HDMI receiver does not match the characteristic impedance of the HDMI transmission line. Therefore, the detection pulse signal, when reaching the HDMI receiver, is reflected by the HDMI receiver, to form a reflected pulse signal. The HDMI transmitter receives the reflected pulse signal from the HDMI receiver via a detection port of the HDMI transmitter. The timing is stopped when the HDMI transmitter receives the reflected pulse signal. Since a propagation speed of the detection pulse signal in the HDMI transmission line is constant, the length of the HDMI transmission line is directly proportional to propagation duration of the detection pulse signal. Therefore, the length of the HDMI transmission line can be determined based on a timing result in this embodiment. The detection port may be one of an HPD port, a DDC port, and a CEC port. That is, the detection port is a port of the HDMI transmitter without an additional port and an additional channel, thereby reducing additional cost. The HDMI output drive circuit is configured based on the swing amplitude and the pre-emphasis intensity. The HDMI transmitter starts to operate and the HPD port as the detection port resumes its own function without affecting normal function of the HDMI transmitter. The detection pulse signal may be a negative pulse signal.

A time period from a time instant when the detection pulse signal is transmitted by the HDMI transmitter to a time instant when the reflected pulse signal is received by the HDMI transmitter is generally nanoseconds. An entire configuration determination process only requires a small amount of system time resources. Further, the detection module is turned off when the detection is completed, without additional power consumption.

Figure 2:
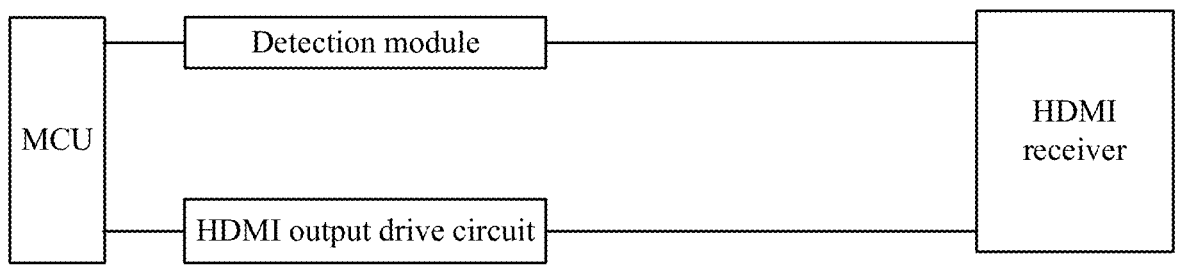
FIG. 2 is a schematic structural diagram of a system for automatically adjusting an intensity of a signal outputted by an HDMI transmitter according to an embodiment of the present disclosure.

Reference is made to FIG. 2, which is a schematic structural diagram of a system for automatically adjusting an intensity of a signal outputted by an HDMI transmitter according to an embodiment of the present disclosure. The system includes a detection module, a microcontroller unit (MCU) and an HDMI output drive circuit.

The detection module is configured to determine a length of an HDMI transmission line between the HDMI transmitter and an HDMI receiver.

The MCU is configured to determine a swing amplitude and a pre-emphasis intensity of a signal outputted by the HDMI transmitter based on the length of the HDMI transmission line and a frequency of the signal outputted by the HDMI transmitter.

The MCU is further configured to configure the HDMI output drive circuit based on the swing amplitude and the pre-emphasis intensity.

Figure 3:
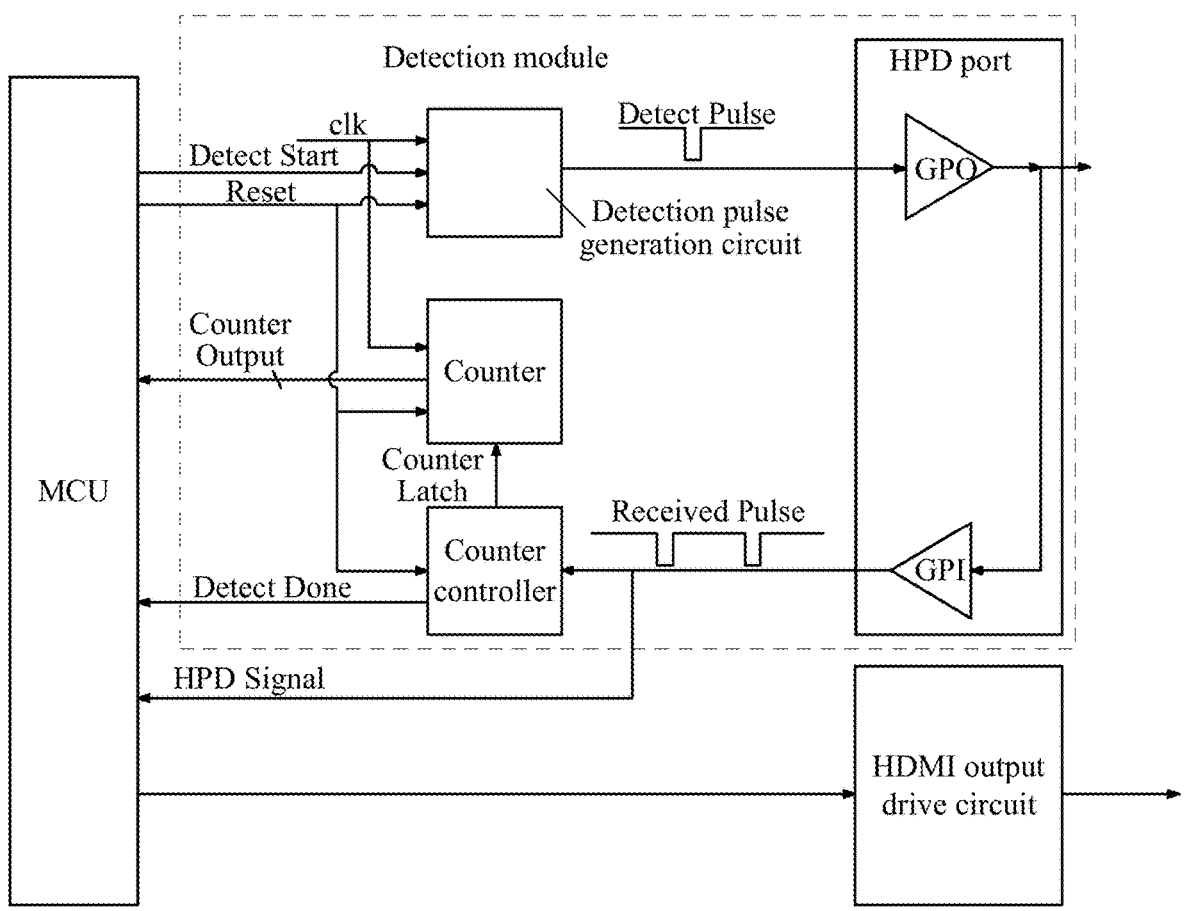
FIG. 3 is a schematic structural diagram of a detection module according to an embodiment of the present disclosure.

A structure of the detection module is schematically shown in a dashed box in FIG. 3. The detection module includes an HPD port, a detection pulse generation circuit, a detection port, a counter controller and a counter.

The HPD port is configured to: determine whether the HDMI receiver is in a connection state; and transmit a signal HPD Signal to the MCU, where the signal HPD Signal indicates whether the HDMI receiver is in a connection state. In case of HPD Signal=1, the HDMI receiver is in a connection state. The HPD port determines whether the HDMI receiver is in a connection state as follows. A pull-up resistor is connected to the HPD port of the HDMI receiver, so that the signal transmitted via an HPD channel of the HDMI transmission line is pulled to a high level in a case that the HDMI receiver is in a connection state. Therefore, if the signal outputted via the HPD port of the HDMI transmitter is in a high level, the HDMI receiver is in a connection state. If the signal outputted via the HPD port of the HDMI transmitter is in a low level, the HDMI receiver is not in a connection state, and it is continuously detected whether the HDMI receiver is in a connection state.

The MCU is configured to transmit a reset signal Reset to each of the detection pulse generation circuit, the counter controller and the counter when the HPD port determines that the HDMI receiver is in a connection state, so that the detection pulse generation circuit, the counter controller and the counter are reset and initialized.

The MCU is further configured to transmit a detection start signal Detect Start to the detection pulse generation circuit when the HPD port determines that the HDMI receiver is in a connection state.

The detection pulse generation circuit is configured to, when the detection start signal Detect Start transmitted by the MCU is received, generate a pulse signal Detect Pulse and transmit the pulse signal Detect Pulse to the detection port.

The detection port is configured to output a detection pulse signal to a channel of the HDMI transmission line corresponding to the detection port in response to the pulse signal transmitted by the detection pulse generation circuit, and transmit a first trigger signal to the counter controller. In this embodiment, when the detection pulse signal is transmitted to the channel of the HDMI transmission line corresponding to the detection port, a trigger pulse signal Received Pulse transmitted to the counter controller serves as the first trigger signal. The detection port is one of an HPD port, a DDC port and a CEC port. An HPD port shown in FIG. 3 is the detection port. The detection pulse signal and the reflected pulse are transmitted via the HPD port. A general-purpose output (GPO) port of the HPD is configured to output data, and a general-purpose input (GPI) port is configured to receive data.

The counter controller is configured to control the counter to start timing when the first trigger signal is received. The counter controller transmits a control signal Counter Latch to the counter to control an operation state of the counter.

The counter is configured to record the number of cycles of a clock signal clk during the timing. The clock signal clk is an operation clock of the detection module, and is generated by another module.

The detection port is further configured to receive a pulse signal reflected by the HDMI receiver, and transmit a second trigger signal to the counter controller when the reflected pulse signal is received. In this embodiment, a trigger pulse signal Received Pulse transmitted by the detection port to the counter controller when the detection port receives the reflected pulse signal serves as the second trigger signal.

The counter controller is further configured to, when the second trigger signal is received, control the counter to stop the timing, and transmit a detection completion signal Detect Done to the MCU to inform the MCU that the detection is completed. The counter controller in this embodiment has a secondary pulse latch function. That is, the counter controller controls the counter to start timing when the first pulse signal is received, and controls the counter to stop the timing when the second pulse signal is received, and a timing result of the counter is latched.

The MCU is further configured to read a timing result Counter Output of the counter when the detection completion signal is received. The timing result indicates the length of the HDMI transmission line.

Figure 4:
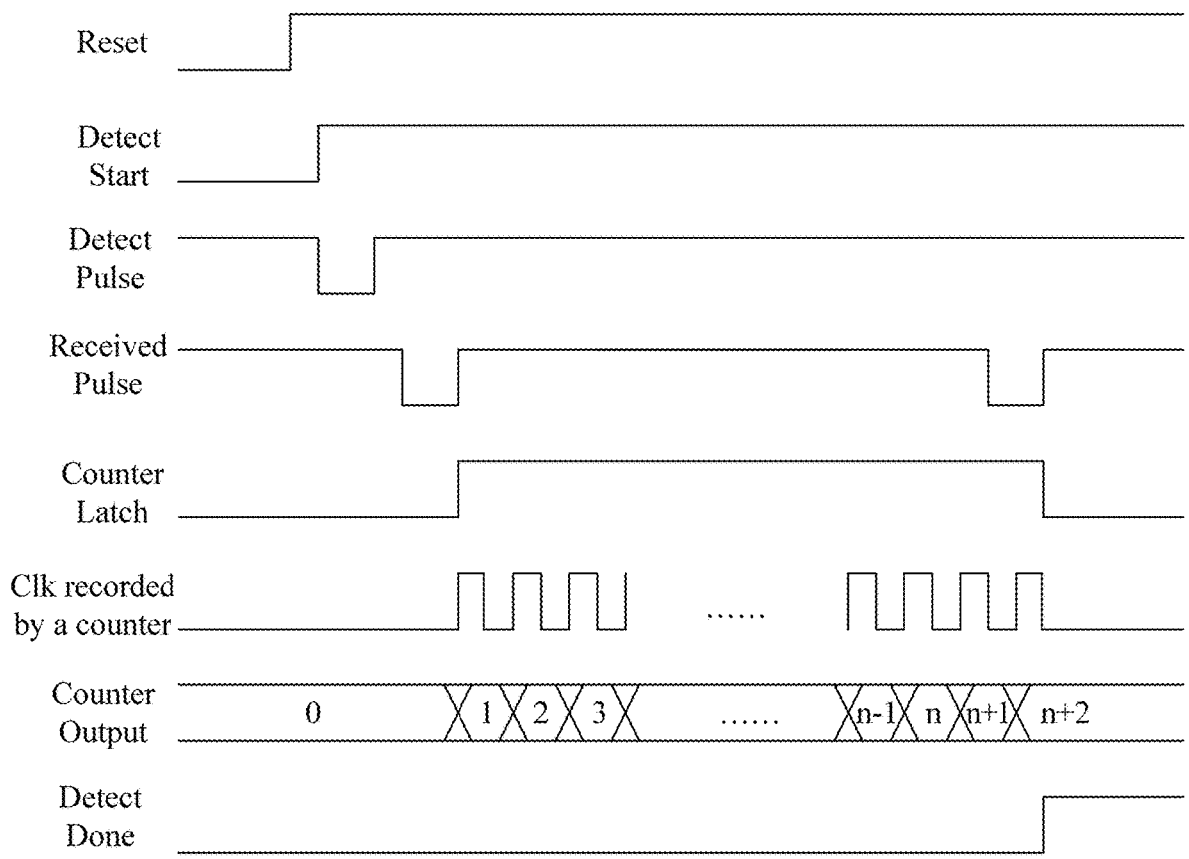
FIG. 4 is a schematic diagram showing signals according to embodiments of the present disclosure.

In some embodiments, each of the detection pulse signal, the first trigger signal, the second trigger signal, and the pulse signal generated by the detection pulse generation circuit is a negative pulse signal. FIG. 4 schematically shows these signals.

Relationship terminologies such as first, second and the like are only used herein to distinguish one entity or operation from another, rather than to necessitate or imply that the actual relationship or order exists between these entities or operations. Further, the term "include", "comprise" or any variant thereof is intended to be nonexclusive, so that a process, method, article or device including a series of elements includes not only those elements but also other elements which are not listed definitely or an element inherent to the process, method, article or device. Unless expressively limited otherwise, the statement "comprising (including) one . . . " does not exclude the case that other similar elements may exist in the process, method, article or device.

Each of the embodiments is mainly focused on describing its differences from other embodiments, and references may be made among these embodiments with respect to the same or similar portions among these embodiments. The features described in the embodiments in the present disclosure may be replaced or combined with each other.

Embodiments of the disclosure are described above, so that those skilled in the art can implement or use the present disclosure. Various modifications to the embodiments are obvious to those skilled in the art, and general principles defined in this specification may be implemented in other embodiments without departing from the spirit or scope of the present disclosure. Therefore, the present disclosure is not limited to the embodiments described in this specification but accords with the widest scope that complies with the principles and novelty disclosed in this specification.

The invention claimed is:

1. A method for automatically adjusting an intensity of a signal outputted by a high definition multimedia interface (HDMI) transmitter, comprising:
    determining a length of an HDMI transmission line between the HDMI transmitter and an HDMI receiver;
    determining a swing amplitude and a pre-emphasis intensity of the signal outputted by the HDMI transmitter based on the length of the HDMI transmission line and a frequency of the signal outputted by the HDMI transmitter; and
    configuring an HDMI output drive circuit based on the swing amplitude and the pre-emphasis intensity;
    wherein the determining a length of an HDMI transmission line between the HDMI transmitter and an HDMI receiver comprises:
    determining whether the HDMI receiver is in a connection state, and transmitting a detection pulse signal to the HDMI receiver via an interface of the HDMI transmitter and starting timing when the detection pulse signal is transmitted in a case that the HDMI receiver is in a connection state; and
    receiving a pulse signal reflected by the HDMI receiver via a detection port of the HDMI transmitter, and stopping the timing when the reflected pulse signal is received, wherein a timing result indicates the length of the HDMI transmission line.

2. The method for automatically adjusting an intensity of a signal outputted by an HDMI transmitter according to claim 1, wherein the detection port is one of a hot plug detection (HPD) port, a display data channel (DDC) port, and a consumer electronics control (CEC) port.

3. The method for automatically adjusting an intensity of a signal outputted by an HDMI transmitter according to claim 1, wherein the detection pulse signal is a negative pulse signal.

4. A system for automatically adjusting an intensity of a signal outputted by a high definition multimedia interface (HDMI) transmitter, comprising: a detection module, a microcontroller unit (MCU) and an HDMI output drive circuit, wherein:
    the detection module is configured to determine a length of an HDMI transmission line between the HDMI transmitter and an HDMI receiver;
    the MCU is configured to determine a swing amplitude and a pre-emphasis intensity of the signal outputted by the HDMI transmitter based on the length of the HDMI transmission line and a frequency of the signal outputted by the HDMI transmitter; and
    the MCU is further configured to configure the HDMI output drive circuit based on the swing amplitude and the pre-emphasis intensity;
    wherein the detection module comprises a hot plug detection (HPD) port, a detection pulse generation circuit, a detection port, a counter controller and a counter, wherein:
    the HPD port is configured to: determine whether the HDMI receiver is in a connection state; and transmit a signal to the MCU, wherein the signal indicates whether the HDMI receiver is in a connection state;
    the detection pulse generation circuit is configured to generate, when a detection start signal transmitted by the MCU is received, a pulse signal and transmit the pulse signal to the detection port;
    the detection port is configured to output a detection pulse signal to a channel of the HDMI transmission line corresponding to the detection port in response to the pulse signal transmitted by the detection pulse generation circuit, and transmit a first trigger signal to the counter controller;
    the counter controller is configured to control the counter to start timing when the first trigger signal is received;
    the counter is configured to record the number of cycles of a clock signal during the timing;
    the detection port is further configured to receive a pulse signal reflected by the HDMI receiver, and transmit a second trigger signal to the counter controller when the reflected pulse signal is received;
    the counter controller is further configured to, when the second trigger signal is received, control the counter to stop the timing, and transmit a detection completion signal to the MCU; and
    the MCU is configured to read a timing result of the counter when the detection completion signal is received, wherein the timing result indicates the length of the HDMI transmission line.

5. The system for automatically adjusting an intensity of a signal outputted by an HDMI transmitter according to claim 4, wherein the detection port is one of an HPD port, a display data channel (DDC) port, and a consumer electronics control (CEC) port.

6. The system for automatically adjusting an intensity of a signal outputted by an HDMI transmitter according to claim 4, wherein each of the detection pulse signal, the first trigger signal, the second trigger signal, and the pulse signal generated by the detection pulse generation circuit is a negative pulse signal.

* * * * *